United States Patent
Chin et al.

(10) Patent No.: US 9,467,833 B2
(45) Date of Patent: Oct. 11, 2016

(54) EMERGENCY CALL RETURN SYSTEMS AND METHODS

(75) Inventors: John H. Chin, San Diego, CA (US); Jonathan J. Sieg, San Diego, CA (US)

(73) Assignee: GreatCall, Inc., San Diego, CA (US)

( * ) Notice: Subject to any disclaimer, the term of this patent is extended or adjusted under 35 U.S.C. 154(b) by 530 days.

(21) Appl. No.: 13/004,612

(22) Filed: Jan. 11, 2011

(65) Prior Publication Data

US 2012/0178404 A1    Jul. 12, 2012

(51) Int. Cl.
*H04M 11/04* (2006.01)
*H04W 4/22* (2009.01)
*H04W 4/14* (2009.01)

(52) U.S. Cl.
CPC ............. *H04W 4/22* (2013.01); *H04W 4/14* (2013.01)

(58) Field of Classification Search
CPC ................................. H04W 4/22; H04W 4/12
USPC ............................................ 455/404.1, 404.2
See application file for complete search history.

(56) References Cited

U.S. PATENT DOCUMENTS

| | | | |
|---|---|---|---|
| 3,663,762 A | 5/1972 | Joel, Jr. | |
| 4,144,411 A | 3/1979 | Frenkiel | |
| 5,797,093 A | 8/1998 | Houde | |
| 6,212,260 B1 * | 4/2001 | Baum et al. | 379/38 |
| 6,295,346 B1 * | 9/2001 | Markowitz et al. | 379/127.01 |
| 6,574,484 B1 | 6/2003 | Carley | |
| 7,050,785 B2 * | 5/2006 | Islam et al. | 455/404.1 |
| 7,123,702 B1 * | 10/2006 | Pershan | 379/114.01 |
| 7,286,860 B2 | 10/2007 | Harris | |
| 7,315,735 B2 | 1/2008 | Graham | |
| 7,616,738 B2 * | 11/2009 | Baum et al. | 379/45 |
| 8,244,204 B1 * | 8/2012 | Chen et al. | 455/404.1 |
| 2003/0063732 A1 * | 4/2003 | Mcknight | 379/210.01 |
| 2003/0108175 A1 * | 6/2003 | Poikselka et al. | 379/210.01 |
| 2003/0141977 A1 | 7/2003 | Brown et al. | |
| 2004/0203622 A1 * | 10/2004 | Esque et al. | 455/412.1 |
| 2005/0083195 A1 | 4/2005 | Pham et al. | |
| 2005/0085257 A1 * | 4/2005 | Laird et al. | 455/550.1 |
| 2007/0071225 A1 | 3/2007 | Leyland | |
| 2008/0304630 A1 * | 12/2008 | Nguyen et al. | 379/45 |
| 2010/0003952 A1 * | 1/2010 | Ray et al. | 455/404.1 |
| 2010/0029243 A1 * | 2/2010 | Ozer et al. | 455/404.1 |
| 2010/0195805 A1 * | 8/2010 | Zeigler et al. | 379/45 |
| 2011/0086607 A1 * | 4/2011 | Wang et al. | 455/404.1 |
| 2011/0222670 A1 * | 9/2011 | Sellers et al. | 379/45 |
| 2012/0171983 A1 * | 7/2012 | Eitel | H04M 11/04 455/404.1 |
| 2012/0282887 A1 * | 11/2012 | Khoo et al. | 455/404.2 |

* cited by examiner

*Primary Examiner* — Shantell L Heiber
(74) *Attorney, Agent, or Firm* — Kilpatrick Townsend & Stockton LLP (57) ABSTRACT

Systems and methods are provided for enabling communication between a service provider and a telephone user in conjunction with a call placed by the user. A call from the user to a particular telephone number, for example an emergency services number, is detected, and a notification is sent to a preselected recipient indicating that the call has been placed. The preselected recipient may be, for example, a private response center operated by a provider of personal health or other services to the user. A predetermined delay time may be allowed to elapse before the preselected recipient is notified of the call to the emergency services number. The preselected recipient may place a second call in reaction to the notification, for example the preselected recipient may call the user on his or her telephone.

24 Claims, 5 Drawing Sheets

911 Call Detected

<u>Calling number</u>    555-555-555

911 Call initiated     2:07 PM
911 Call ended         2:35 PM

<u>Client Information</u>
    Client Name:    Elizabeth Smith  (Betty)
    Address:        123 Main St.
                    Smalltown, VA     Age: 86

<u>Special Situations</u>
    Lives alone

<u>Contact Information</u>
    Barbara Jones (Daughter) 555-666-6666
    John Smith (Son)         555-777-7777

<u>Medical Conditions</u>
    Diabetes
    Elevated blood pressure
    Mild hearing loss <u>Medications</u>
    Insulin
    Cholesterol medication <u>Medicine Allergies</u>
    Penicillin

EMERGENCY CALL RETURN SYSTEMS AND METHODS

BACKGROUND

Nearly all locations within the United States and Canada are now served by "911" emergency telephone service, and many other countries have similar services. In the 911 system, calls to the telephone number 911 are specially routed to a public safety answering point (PSAP), where a specially-trained dispatcher can assess the nature of the emergency, offer assistance, summon emergency services or law enforcement personnel to the source of the call, or provide other services. Many PSAPs are interconnected to allow routing calls and other information between them. The 911 service facilitates rapid response by the appropriate authorities in cases of emergency.

In order to maximize the effectiveness of 911 service, special rules apply to the handling of many 911 calls. For example, in the wireline Enhanced 911 system, provision must be made for the dispatcher to call back to the telephone that placed a 911 call, in the event a call is interrupted for any reason, for example mistakenly by a distraught or injured caller. In conventional wireline systems, a 911 dispatcher knows the location of the caller, because the location of the telephone from which the call is made is known through caller ID or similar services.

The handling of 911 calls is complicated by the increasing use of mobile telephones. Because the location of a mobile telephone is not fixed, the 911 dispatcher may have an increased need for verbal communication with the caller in order to learn the location of the emergency, so that emergency services or law enforcement personnel can be sent to the scene. Location services for mobile phones determine and route location information to the PSAP to facilitate dispatch of emergency responders to the caller.

BRIEF SUMMARY

One embodiment enables communication between a service provider and a telephone user in conjunction with a call placed by the user. A call from the user to a particular telephone number, for example an emergency services number, is detected, and a notification is sent to a preselected recipient indicating that the call has been placed. The preselected recipient may be, for example, a private response center operated by a provider of personal health or other services to the user. A predetermined delay time may be allowed to elapse before the preselected recipient is notified that the call has occurred, so as not to interfere with any potential callback from emergency services personnel. The preselected recipient may place a second call in response to the notification. For example, the preselected recipient may call the user back on his or her telephone, or may call another designated party.

According to some embodiments, a device with telephone capability includes an input interface, a transceiver, a microprocessor, a power subsystem, and a computer readable memory. The computer readable memory holds microprocessor instructions that, when executed by the microprocessor, cause the device with telephone capability to detect that a call has been placed using the input interface to an emergency services telephone number using the transceiver, and to send a notification to a preselected recipient indicating that the call has been placed to the emergency services telephone number. The instructions may further cause the device with telephone capability to send the notification using a short message service (SMS) message to the preselected recipient indicating that the call has been placed to the emergency services telephone number. In some embodiments, the instructions cause the device with telephone capability to send the notification to the preselected recipient indicating that the call has been placed to the emergency services telephone number after completion of the call to the emergency services telephone number. The instructions may cause the device with telephone capability to delay for a predetermined time after the call to the emergency services telephone number has ended before sending the notification to the preselected recipient. In some embodiments, the device with telephone capability includes in the notification sent to the preselected recipient an indication that the call to the emergency services telephone number has ended. In some embodiments, the device with telephone capability includes in the notification sent to the preselected recipient an indication of the time at which the call to the emergency services telephone number ended. The device with telephone capability may send to the preselected recipient an indication of the location of the device with telephone capability. In some embodiments, the instructions, when executed by the microprocessor, cause the device with telephone capability to, after the call to the emergency services telephone number has ended and before sending the notification to a preselected recipient indicating that the call has been placed to the emergency services telephone number, delay for a predetermined time, and after the predetermined time has elapsed, determine the location of the device with telephone capability. The device with telephone capability may be a wireless telephone. The device with telephone capability may be a cellular telephone.

According to other embodiments, a system for operating a call service center includes a computer system including a processor and memory holding instructions executable by the processor, and also includes a network connection from the computer system to an electronic communications network. The instructions, when executed by the processor, cause the computer system to receive via the connection to the electronic communications network a notification indicating that a particular device with telephone capability has been used to place a first call to an emergency services telephone number not associated with the call service center. The instructions also cause the computer system to, after the first call has ended, place a second call in reaction to the notification that the particular device with telephone capability has been used to place the first call to the emergency services telephone number. In some embodiments, the instructions cause the computer system to place the second call to the particular device with telephone capability. The instructions may cause the computer system to place the second call to a previously-designated third party. In some embodiments, the instructions further cause the computer system to receive via a short message service message received over the electronic network the notification indicating that the particular device with telephone capability has been used to place the first call. In some embodiments, the computer system receives, from the particular device with telephone capability, the notification that the particular device with telephone capability has been used to place the first call. The computer system may delay by a predetermined time period after the first call has ended before placing the second call.

In some embodiments, the computer system further includes a display screen and an input device, and the instructions further cause the computer system to display on the display screen an indication that the particular device with telephone capability has been used to place the first call to the emergency services telephone number, accept an input from the input device, and in response to the input, place the second call. In some embodiments, the computer system further includes a display screen, and the instructions further cause the computer system to retrieve from a database information relating to a person associated with the particular device with telephone capability, and to display the retrieved information on the display screen. In some embodiments, the computer system further includes a display screen, and the instructions further cause the computer system to retrieve from a database information relating to the medical status of a person associated with the particular device with telephone capability, and to display the retrieved information on the display screen. In some embodiments, the computer system further includes a display screen, and the instructions further cause the computer system to receive an indication of the location of the device with telephone capability, and to display the location on the display screen. The instructions may further cause the computer system to enable a call waiting feature for the device with telephone capability in response to the notification that the device with telephone capability has been used to place the first call. The instructions may further cause the computer system to enable a voice mail feature for the device with telephone capability in response to the notification that the device with telephone capability has been used to place the first call. The instructions may further cause the computer system to enable a text messaging feature for the device with telephone capability in response to the notification that the device with telephone capability has been used to place the first call.

According to some embodiments, a method of operating a call service center includes receiving, at the call service center via an electronic network by a computer system not affiliated with a public safety answering point, a notification indicating that a particular device with telephone capability has been used to call an emergency services telephone number. Receiving the notification indicating that the particular device with telephone capability has been used to call an emergency services telephone number comprises receiving an indication that the call to the emergency services telephone number ended. The method further includes placing, by the computer system, a telephone call to the particular device with telephone capability. The telephone call to the particular device with telephone capability is placed after a predetermined time period has elapsed after the call to the emergency services telephone number has ended. In some embodiments, the receipt of the notification indicating that the particular device with telephone capability has been used to call the emergency services telephone number serves as the indication that the call to the emergency services telephone number ended. In some embodiments, the method also includes displaying on a display screen an indication that the particular device with telephone capability has been used to call the emergency services telephone number. The method may also include, after receiving the notification indicating that the particular device with telephone capability has been used to call the emergency services telephone number, retrieving from a database information relating to a person associated with the particular device with telephone capability, and displaying the retrieved information on the display screen.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, systems, structures, and other components may be shown as components in block diagram form in order not to obscure the embodiments in unnecessary detail. In other instances, well-known processes, procedures and techniques may be shown without unnecessary detail in order to avoid obscuring the embodiments.

Also, it is noted that individual embodiments may be described as a process which is depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but could have additional steps not included in a figure. Furthermore, embodiments may be implemented by manual techniques, automatic techniques, or any combination thereof.

Figure 1:
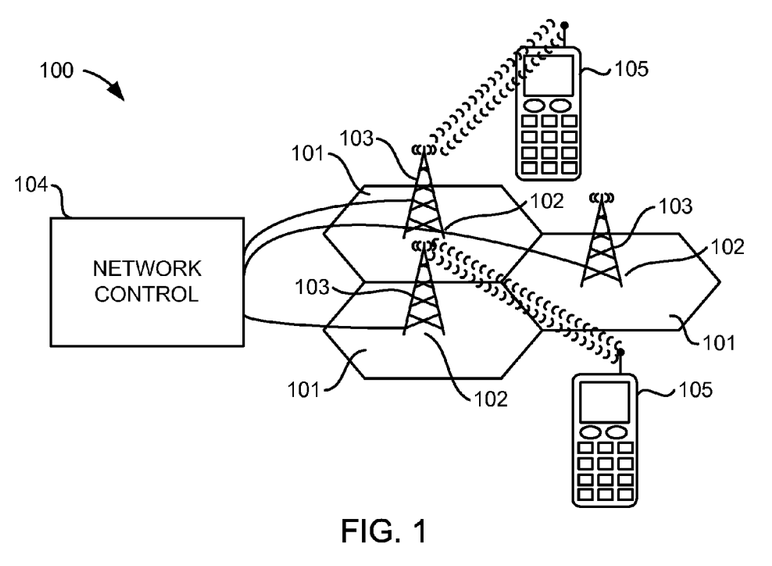
FIG. 1 is a simplified schematic diagram of a cellular telephone network.

FIG. 1 is a simplified schematic diagram of a cellular telephone network 100. Cellular networks are an especially efficient way to provide mobile telephone service. Each cell 101 is served by a base station 102, which often includes an antenna mounted on a tower 103. Each cellular telephone active in a particular cell can bidirectionally interact with the base station of the cell, enabling full duplex communication of data and/or voice. Each cell 101 is capable of communicating with mobile telephones 105 within the respective cell 101 according to a physical interface scheme (e.g., CDMA, LTE, GSM, GPRS, WiMax, etc.). Each base station 102 typically is capable of communicating simultaneously with several dozen different mobile telephones 105.

Adjacent cells 101 use different frequencies or coding to avoid interference. In this way, many mobile telephones can be supported using a limited spectra. The size and density of the cells 101 may be determined in part by the demand for service. While only three cells 101 are shown in FIG. 1, many cells 101 may be present. Special hand-off protocols may be used for maintaining communication with a particular telephone that moves from one cell 101 to another during a call.

As shown in FIG. 1, each base station 102 communicates with a network controller 104. It will be understood that FIG. 1 is highly simplified, and network controller 104 represents a wide array of hardware, software, and other components performing a wide variety of functions. For example, network controller 104 may route calls between cells 101 and outside telephone providers, monitor telephone usage, maintain billing records for individual telephone accounts, perform diagnostic tests, and perform many other functions.

Figure 2:
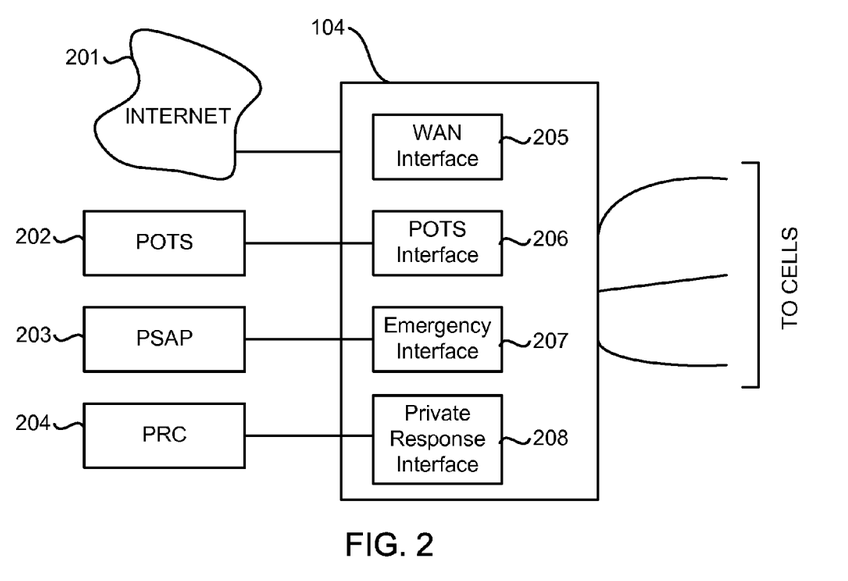
FIG. 2 is a simplified block diagram of network controller illustrating interfaces in accordance with an embodiment.

Network controller 104 may also include interfaces between network 100 and other networks, organizations, or services. For example, FIG. 2 is a block diagram of network controller 104, still highly simplified, illustrating interfaces 205, 206, 207, 208 to the Internet 201, a plain old telephone system (POTS) 202, a PSAP 203, and a private response center (PRC) 204. Other interfaces to location services, data services, billing systems, etc. are typical, but not shown.

WAN interface 205 connects network 100 with the Internet 201. The Internet 201 is a global system of interconnected computer networks, and enables digital communication between computers. Applications of the Internet 201 include the carrying of electronic mail, audio and video feeds, and other kinds of digital messages. One especially popular use of the Internet 201 is for the hosting and viewing of interlinked documents on the World Wide Web. Many modern mobile telephones, including cellular telephones of the kind supported by network 100, include the capability to access documents and communications through the Internet 201, for example sending and receiving electronic mail and viewing web pages. Other embodiments could us a wide area network (WAN) separate from or tunneled through the Internet 201.

POTS interface 206 connects network 100 with the plain old telephone system (POTS) 202. POTS 202 comprises, for example, a large number of traditional wireline telephones and other communications equipment, as well as the infrastructure required to support them. Many residential and small business telephones are part of POTS 202, which may still support telephone hardware that is decades old. POTS interface 206 enables users of mobile telephones that are part of network 100 to call telephones that utilize POTS 202, and vice versa.

Emergency interface 207 connects network 100 to PSAP 203, so that calls to the 911 emergency number made by mobile phone users on network 100 can be routed to a PSAP 203 or routed between multiple PSAPs 203. The PSAP 203 may be additionally served by POTS 202, or by another system.

Private response interface 208 connects network 100 to private response center 204. For example, private response center 204 may be operated by a service provider who offers personalized assistance to clients who subscribe to the service. In some embodiments, the service provider may offer personal health management advice, concierge services, navigational assistance, technical support for telephones used in conjunction with the service, or other kinds of personalized services deliverable by telephone. Private response center 204 may be staffed by customer service representatives who answer inquiries from clients of the service. Such a service may especially appeal to clients with health or other impairments. For example, the service could include weekly or daily calls to the client for verification that the client is doing well, and if not, the customer service representative may offer to contact a family member, health care provider, or other resource that may be helpful to the client. The service could include these and other services sold as a package.

Private response center (PRC) 204 is not intended to be a substitute for the PSAP 203. A client of the service offered by private response center 204 would still be expected to dial 911 in the event of an emergency. However, the service provider who operates private response center 204 may still wish to provide assistance to the client, in conjunction with the emergency, of a kind not normally provided by the 911 system. For example, the service provider may be available to contact family members of the client to notify them of the emergency. The service provider may also maintain records that may be helpful to the client in relation to the emergency, for example a list of medications currently being taken by the client.

In one example scenario, the service provider that operates private response center 204 may also be a cellular telephone service provider, and may offer a private assistance service as an adjunct to cellular telephone service. The private response center 204 can be contacted for non-emergency service through a phone number, speed dial or other shortcut, for example by activating a 5 and * key combination. The connection between network controller 104 and private response center 204 is schematic. The actual connection could be by way of the Internet 201, a wireless connection, a voice-over-Internet-protocol (VoIP) connection, a cellular telephone connection, or private response center 204 could be reached through POTS 202, or any other suitable connection method that enables a telephone user to reach private response center 204 by calling a telephone number. Private response center 204 may be reachable via multiple methods.

Figure 3:
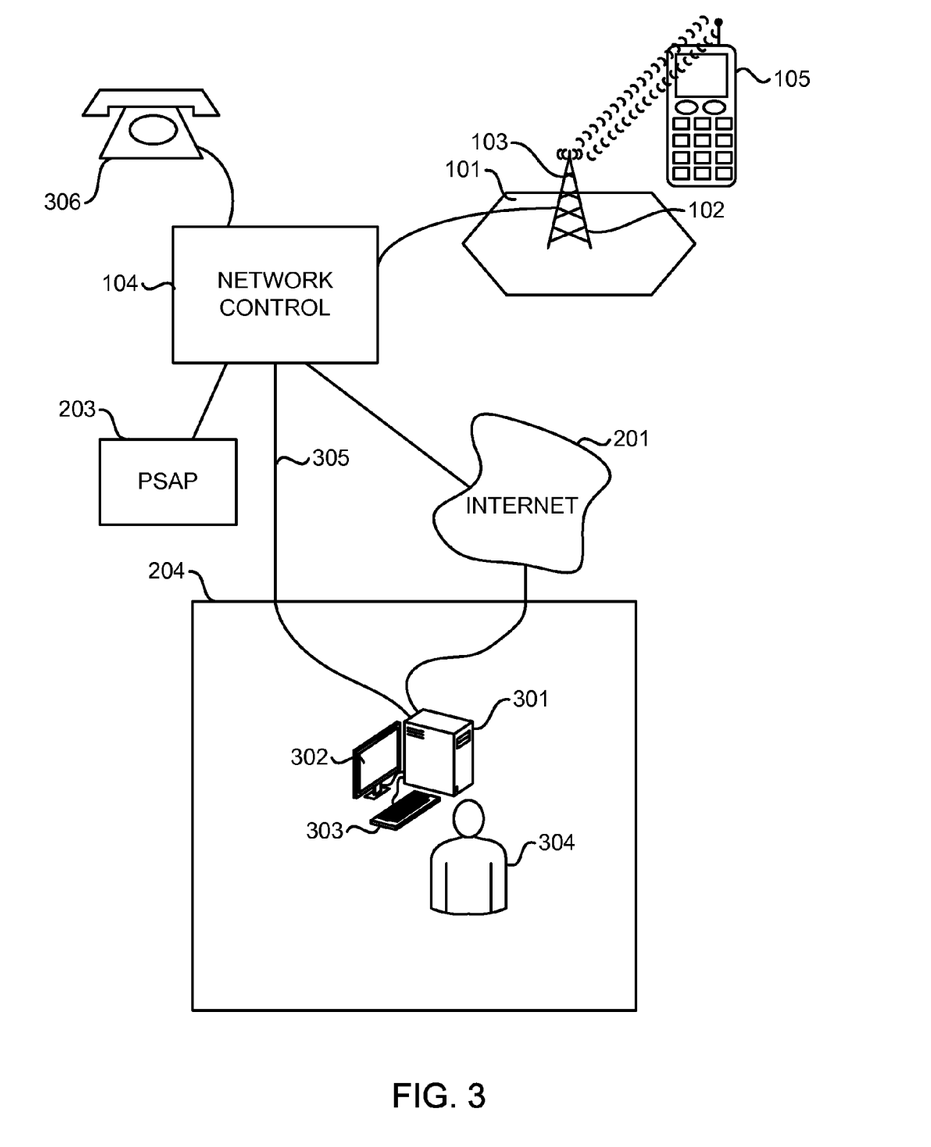
FIG. 3 illustrates entities involved in a typical scenario in accordance with an embodiment.

FIG. 3 illustrates the entities involved in a typical scenario in accordance with an embodiment. As shown in FIG. 3, private response center 204 preferably comprises a computer system 301 that facilitates many of the functions of private response center 204. Computer system 301 includes a display screen 302 and an input device 303 for displaying information to and receiving inputs from a service representative 304. Input device 303 may be, for example, a keyboard, mouse, or other kind of input device or a combination of input devices. While computer system 301 is depicted in FIG. 3 as a single, stand-alone computer, computer system 301 may include multiple interconnected computers, which may be collocated or widely distributed. Computer system 301 may include various forms of data storage, including volatile and nonvolatile memory, and long term data storage. At least some of the data storage holds instructions executable by a processor of computer system 301 to perform functions in accordance with an embodiment. In the example of FIG. 3, private response center 204 is connected to network controller 104 through multiple channels, including the Internet 201, and a telephone connection 305, which may be a wireline connection, wireless connection, or any other connection that enables private response center 204 to make telephone calls. Many other arrangements are possible. For example, private response center 204 may be able to make telephone calls over the Internet 201 using a voice-over-IP system.

Figure 4:
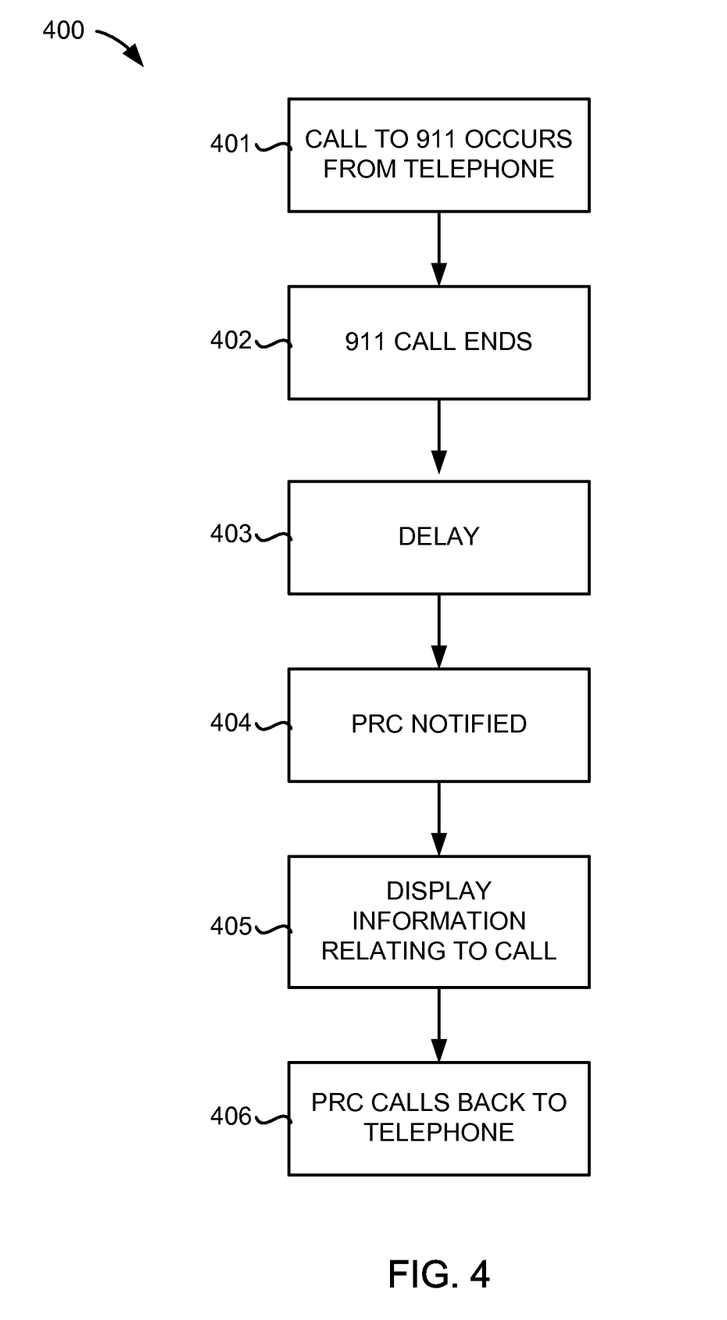
FIG. 4 is a flow chart illustrating steps performed by entities shown in FIG. 3, in accordance with an embodiment.

FIG. 4 is a flow chart 400 illustrating steps performed by the various entities. At step 401, a telephone user places a call to 911 service or PSAP 203. For example, the call may originate from mobile telephone 105 and be relayed to network controller 104 via cell 101, or the call may originate from conventional wireline phone 306, which may utilize POTS 202. The call is relayed to network controller 104, which recognizes that the call is to 911 and passes the call to PSAP 203. At step 402, the call ends. The call may end intentionally or unintentionally. For example, the 911 dispatcher may stay on the line until an ambulance arrives at the caller's location, and the call may be ended intentionally because its purpose has been served. Or the call may have been accidental, and may be ended intentionally by the caller. But the call may also be ended accidentally, for example by a distraught or injured caller, or because the call is dropped prematurely by the telephone system.

If the client's 911 call was prematurely ended, the emergency services personnel at PSAP 203 will call the client back to continue assistance. It is very important that actions of private response center 204 and the client's telephone do not interfere with communications between the client and the 911 dispatcher. At step 403, a delay is implemented, during which the originating telephone does not initiate any communications, so as not to interfere with any potential callback from emergency services personnel at PSAP 203. The length of the delay may be selected to be long enough to avoid interference with any potential callback from the emergency services personnel, but short enough that meaningful assistance can be offered in relation to the client's emergency. For example, the delay time may be set at 1 minute, 2 minutes, 5 minutes, 10 minutes, 15 minutes, 20 minutes, 30 minutes, 1 hour, or another suitable time based on expected 911 callback times.

Once the delay has elapsed, PRC 204 is notified in step 404 that the 911 call has occurred. For example, mobile telephone 105 may send a short message service (SMS) message to PRC 204 indicating that the 911 call occurred. In some embodiments, the notification itself, by whatever means, serves as an indication that the 911 call has ended. Other information may also be included in the notification, for example the location of mobile telephone 105, the times at which the 911 call originated and ended, the time at which mobile telephone 105 determined its location as describe further below, or other information. The content of the SMS message may be encrypted or otherwise encoded, and readily decipherable only by PRC 204. In this way, the client's location and other information may be kept confidential.

Figure 5:
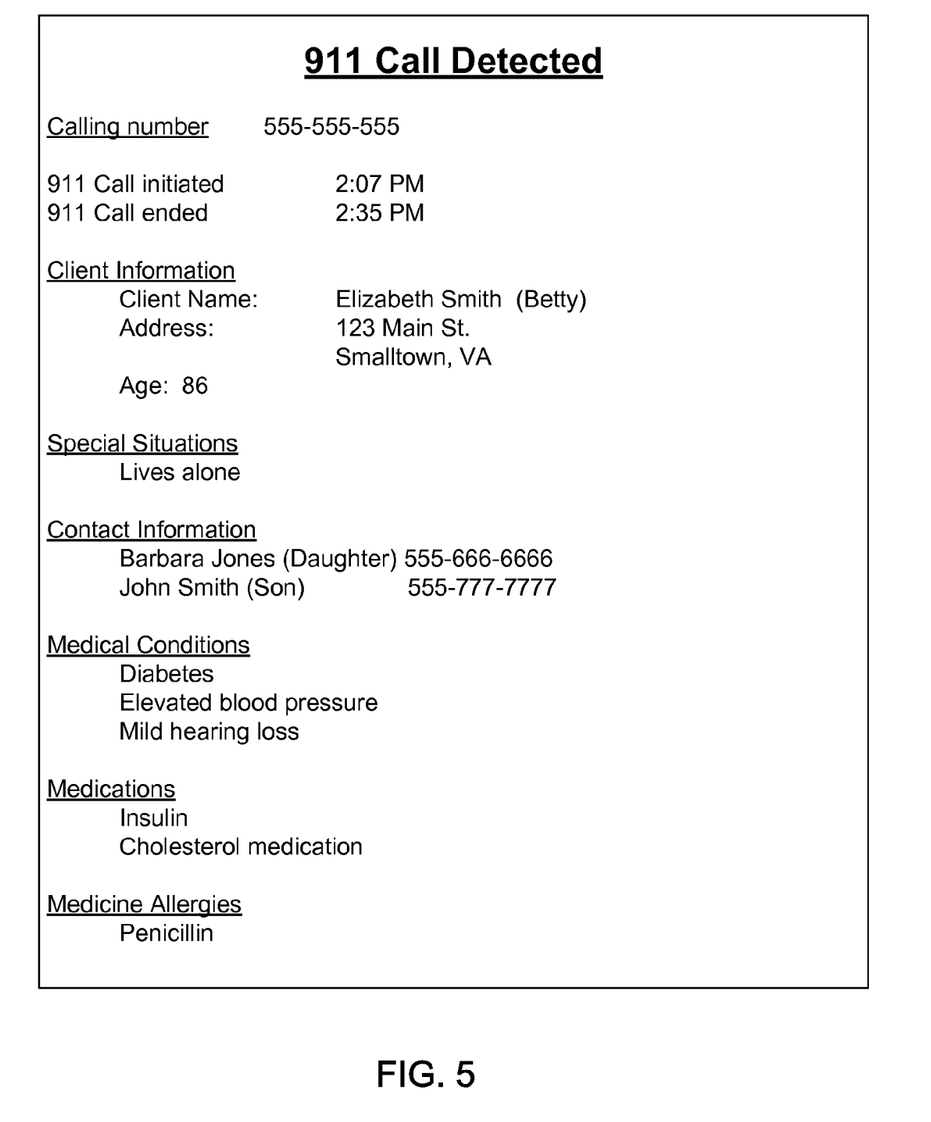
FIG. 5 illustrates an example information display, in accordance with an embodiment.

In step 405, information about the 911 call placed by the client is displayed on display screen 302. For example, a screen such as is shown in FIG. 5 may be displayed. The displayed information may include such items as the number from which the 911 call was placed, the time of the call, the time the call ended, or the time at which mobile telephone 105 determined its location. In addition, computer system 301 may retrieve additional information from a database accessible to computer system 301, and display additional information that may be helpful in assisting the client. For example, as is shown in FIG. 5, the additional information could include the client's name and address, family contact numbers, a list of the client's medical conditions and current medications, or other kinds of information. Some or all of the additional information may have been collected and stored in the database upon the client's enrollment in the service provided by private response center 204.

Referring again to FIG. 4, in step 406, PRC 204 places a second call in reaction to the notification that the original 911 call occurred. For example, PRC 204 may call the client at the number from which the 911 call originated, to verify that the client has received assistance or to offer additional services. Alternatively, PRC 204 may call a previously-designated third party, for example a family member of the client, to notify them that the 911 call occurred. The second call may be placed automatically, or may be placed by service representative 304. For example, computer system 301 may display an indication to service representative 304 that the 911 call occurred, and service representative 304 may then use input device 303 to signal computer system 301 to place a call to the client. Alternatively, computer system 301 may automatically initiate a call to the client or third party.

During the call from private response center 204 to the client or third party, service representative 304 may offer additional assistance or services that are not normally part of the duties of emergency services personnel or the 911 dispatcher. For example, service representative 304 may offer to contact a family member of the client to inform them of the emergency. Or the client could pass the phone to any emergency services personnel on the scene and service representative 304 could inform them of the client's ongoing medical conditions, current medications, or other relevant information accessible to service representative 304.

Figure 6:
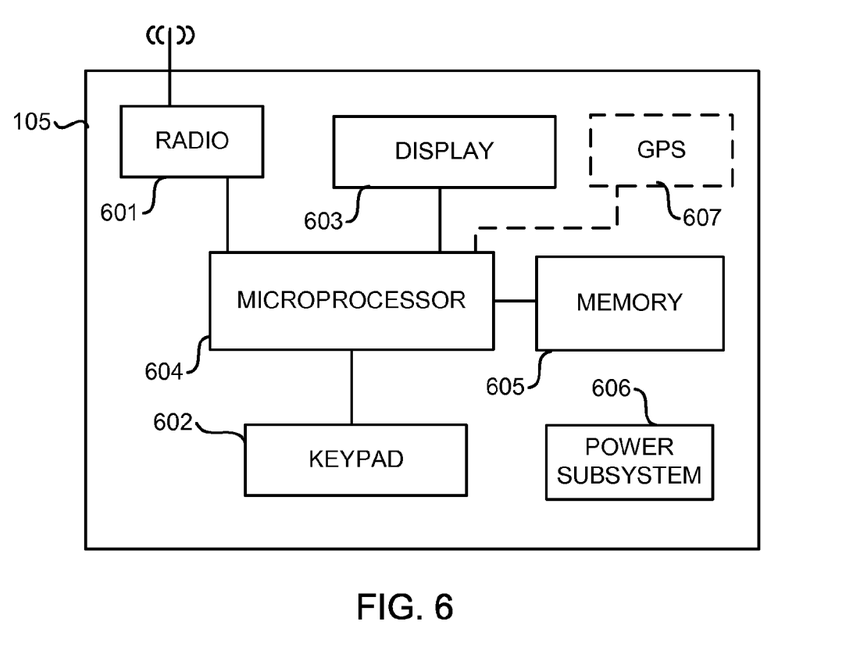
FIG. 6 illustrates a simplified block diagram of an exemplary mobile telephone suitable for use in embodiments.

In some embodiments, the detection of the original 911 call and the notification of private response center 204 are performed by the client's mobile telephone itself. FIG. 6 illustrates a simplified block diagram of a mobile telephone 105, suitable for use in embodiments. Mobile telephone 105 includes a radio transmitter/receiver 601 for communicating with network 100, a keypad 602 for receiving inputs from the user of mobile telephone 105, and a display 603 for communicating information to the user. Display 603 may comprise any means of visually communicating information to the user. For example, display 603 may comprise a backlit or passive liquid crystal display (LCD) or another kind of display capable of showing graphical or alphanumeric information. Display 603 could comprise a simple set of indicator lights, for example made of light emitting diodes or another kind of light source. Many other kinds of displays are possible. The operation of mobile telephone 105 is controlled by a microprocessor 604 executing instructions stored in a computer readable memory 605. Computer readable memory 605 may include volatile memory, non-volatile memory, reprogrammable memory, or a combination of these. Microprocessor 604 may be any suitable kind of processor, for example a complex instruction set microprocessor, a reduced instruction set microprocessor, a digital signal processor, a microcontroller, or any other circuitry or combination of components that performs similar functions. A power subsystem 606 routes power to the other components. Optionally, a GPS receiver 607 may be included, enabling mobile telephone 105 to accurately determine its location via GPS. In some embodiments, the power subsystem may include a battery and provision for recharging the battery. The depiction of mobile telephone 105 is simplified, and other components may be present.

Figure 7:
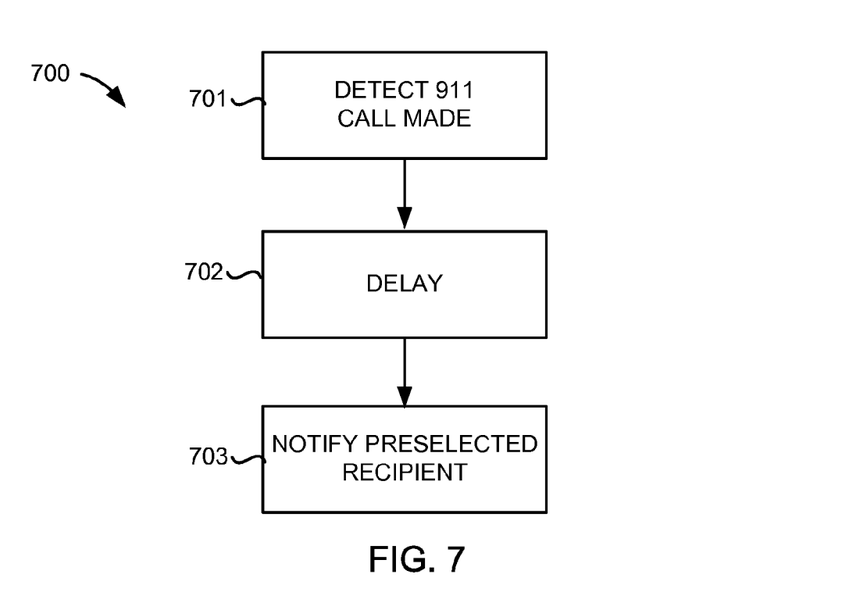
FIG. 7 illustrates a flow chart of a method that may be performed by mobile telephone in accordance with an embodiment.

FIG. 7 illustrates a flow chart 700 of a method that may be performed by mobile telephone 105 in accordance with embodiments. In step 701, mobile telephone 105 detects that it has been used to dial 911. For example, microprocessor 604 may keep a running log of keys pressed on keypad 602, and recognize that keys in the sequence 9-1-1 have been pressed and that a call resulted. In step 702, mobile telephone 105 may delay by a predetermined time. For example, upon termination of the 911 call, mobile telephone 105 may start a timer, and not initiate any communication until the predetermined delay time has elapsed. The delay ensures that mobile telephone 105 is available to respond to incoming calls during the time when emergency services personnel are likely to call back after an interrupted call. In step 703, mobile telephone 105 notifies private response center 204 or another preselected recipient that the 911 call has occurred. In some embodiments, computer system 301 at private response center 204 is configured to receive short message service (SMS) messages and mobile telephone 105 is configured to be able to send SMS messages, and mobile telephone 105 notifies private response center 204 of the 911 call using an SMS message. Mobile telephone 105 could notify PRC 204 using a telephone call. Preferably, mobile telephone 105 is configured to retry the notification in the event that a first attempt to reach PRC 204 is unsuccessful. For example, if the network is busy, a first attempt to notify PRC 204 may fail. Mobile telephone 105 may be programmed to wait a predetermined time after a failed notification attempt and to try again to reach PRC 204. Mobile telephone 105 may be programmed to perform multiple retries.

Other capabilities of mobile telephone 105, network 100, or other resources may be utilized to facilitate assistance of the client by private response center 204. For example, mobile telephone 105 may transmit an indication of its location to private response center 204. The transmission of the location information may be done at the time mobile telephone 105 notifies private response center 204 of the fact that a 911 call has been placed, may be done during the subsequent call from private response center 204 to the mobile phone, or at another time. Mobile telephone 105 may be able to determine or at least approximate its location in any of several ways. For example, mobile telephone 105 may include a global positioning system (GPS) receiver, and may be able to determine its location very accurately using GPS information. Or mobile telephone 105 may be able to approximate its location using information gained from network 100. In some embodiments, mobile telephone 105 may determine its location after a delay time has passed since the 911 call ended, for example delay 702 depicted in FIG. 7.

In other embodiments, certain configurable capabilities of mobile telephone 105 may be utilized in an emergency situation, even if the user of mobile telephone 105 has not separately subscribed to those services. For example, if private response center 204 calls the client after the client places a 911 call and the client does not answer the call from private response center 204, a service representative 304 may leave a voice mail message for the client. If the client has not previously subscribed to a voice mail service, voice mail capability may be enabled for the client's phone, in the interest of maximizing the probability of providing useful assistance in the client's emergency.

In another example, a call waiting or similar service could be activated, even if the client has not previously purchased such a service, so that the probability of reaching the client is maximized. Similarly, a text messaging capability could be activated, even if the client has not previously subscribed to a telephone plan that includes text messaging.

In other embodiments, PRC 204 may be notified by network controller 104 that a particular telephone has been used to call an emergency services telephone number. For example, network controller 104 may maintain or access records about the clients of PRC 204, and in accordance with a preexisting agreement between the operator of network controller 104 and the service provider that operates private response center 204, may notify PRC 204 whenever one of the clients of PRC 204 calls an emergency services telephone number. Network controller 104 may implement a predetermined delay before notifying PRC 204 of a call to an emergency services number. Once notified, PRC 204 may place a second call, for example to the original caller or to a previously-designated third party. PRC 204 may implement a delay before placing the second call While embodiments have been described above in the context of a private response center being notified of a client's call to a 911 emergency number, systems and methods in accordance with embodiments may be used in other contexts as well, for example for detecting a call to any particular number and then notifying a preselected recipient about the call.

In addition, embodiments may be used with wireline telephones, and are not limited to use with cellular or mobile telephones.

In the above description and the appended claims, the word "or" is to be interpreted inclusively rather than exclusively, unless otherwise indicated. For example, the statement that "other information may also be included in the notification, for example the location of mobile telephone 105, the times at which the 911 call originated and ended, or other information" means that the notification may include any one, any combination, or all of the listed items without any additional information items; may include only other information not included in the listed items; or may include information not included in the enumerated list in conjunction with any one, any combination, or all of the listed items.

While the principles of the disclosure have been described above in connection with specific apparatuses and methods, it is to be clearly understood that this description is made only by way of example and not as limitation on the scope of the disclosure.

What is claimed is:

1. A device with telephone capability, the device comprising:
   an input interface;
   a transceiver;
   a microprocessor;
   a power subsystem; and
   a computer readable memory, the computer readable memory holding microprocessor instructions that, when executed by the microprocessor, cause the device with telephone capability to:
   detect that a call has been placed using the input interface to an emergency services telephone number using the transceiver and that the call to the emergency services telephone number has ended;
   after the call to the emergency services telephone number has ended, delay by a predetermined time, and after the delay, send a notification to a preselected recipient indicating that the call has been placed to the emergency services telephone number; and
   send to the preselected recipient an indication of a location of the device with telephone capability;
   wherein the delay elapses before any notification that the call has been placed to the emergency services telephone number is sent to any preselected recipient;
   and wherein the location of the device with telephone capability is determined by the device with telephone capability after the delay and before sending the notification to a preselected recipient indicating that the call has been placed to the emergency services telephone number.

2. The device with telephone capability as recited in claim 1, wherein the instructions, when executed by the microprocessor, cause the device with telephone capability to send the notification using a short message service (SMS) message to the preselected recipient indicating that the call has been placed to the emergency services telephone number.

3. The device with telephone capability as recited in claim 1, wherein the instructions, when executed by the microprocessor, cause the device with telephone capability to include in the notification sent to the preselected recipient an indication that the call to the emergency services telephone number has ended.

4. The device with telephone capability as recited in claim 3, wherein the instructions, when executed by the microprocessor, cause the device with telephone capability to include in the notification sent to the preselected recipient an indication of a time at which the call to the emergency services telephone number ended.

5. The device with telephone capability as recited in claim 1, wherein the device with telephone capability is a wireless telephone.

6. The device with telephone capability as recited in claim 1, wherein device with telephone capability is a cellular telephone.

7. A system for operating a call service center, the system comprising:
   a computer system including a processor and memory holding instructions executable by the processor; and
   a network connection from the computer system to an electronic communications network;
   wherein the instructions, when executed by the processor, cause the computer system to
   receive via the connection to the electronic communications network a notification indicating that a particular device with telephone capability has been used to place a first call to an emergency services telephone number not associated with the call service center;
   receive from the particular device with telephone capability an indication of a geographic location of the particular device with telephone capability; and
   after the first call has ended, delay for at least one minute and then place a second call to the particular device with telephone capability in reaction to the notification that the particular device with telephone capability has been used to place the first call to the emergency services telephone number.

8. The system for operating a call service center as recited in claim 7, wherein the instructions further cause the computer system to receive via a short message service message received over the electronic network the notification indicating that the particular device with telephone capability has been used to place the first call.

9. The system for operating a call service center as recited in claim 7, wherein the instructions further cause the computer system to receive, from the particular device with telephone capability, the notification indicating that the particular device with telephone capability has been used to place the first call.

10. The system for operating a call service center as recited in claim 7, wherein the computer system further comprises a display screen and an input device, and wherein the instructions further cause the computer system to:
    display on the display screen an indication that the particular device with telephone capability has been used to place the first call to the emergency services telephone number;
    accept an input from the input device; and
    in response to the input, place the second call.

11. The system for operating a call service center as recited in claim 7, wherein the computer system further comprises a display screen, and wherein the instructions further cause the computer system to:
    retrieve from a database information relating to a person associated with the particular device with telephone capability; and
    display the retrieved information on the display screen.

12. The system for operating a call service center as recited in claim 7, wherein the computer system further comprises a display screen, and wherein the instructions further cause the computer system to: retrieve from a database information relating to a medical status of a person associated with the particular device with telephone capability; and display the retrieved information on the display screen.

13. The system for operating a call service center as recited in claim 7, wherein the computer system further comprises a display screen, and wherein the instructions further cause the computer system to:
    display the geographic location on the display screen.

14. The system for operating a call service center as recited in claim 7, wherein the instructions further cause the computer system to:
    enable a call waiting feature for the device with telephone capability in response to the notification that the device with telephone capability has been used to place the first call, even though a user of the device with telephone capability has not previously subscribed to the call waiting feature.

15. The system for operating a call service center as recited in claim 7, wherein the instructions further cause the computer system to:
    enable a voice mail feature for the device with telephone capability in response to the notification that the device with telephone capability has been used to place the first call, even though a user of the device with telephone capability has not previously subscribed to the voice mail feature.

16. The system for operating a call service center as recited in claim 7, wherein the instructions further cause the computer system to:
    enable a text messaging feature for the device with telephone capability in response to the notification that the device with telephone capability has been used to place the first call, even though a user of the device with telephone capability has not previously subscribed to the text messaging feature.

17. A method of operating a call service center, the method comprising:
    receiving, at the call service center via an electronic network by a computer system not affiliated with a public safety answering point, a notification indicating that a particular device with telephone capability has been used to call an emergency services telephone number not associated with the call service center, wherein receiving the notification indicating that the particular device with telephone capability has been used to call an emergency services telephone number comprises receiving an indication that the call to the emergency services telephone number ended;
    receiving from the particular device with telephone capability an indication of a geographic location of the particular device with telephone capability; and
    placing, by the computer system at the call service center, a telephone call to the particular device with telephone capability;
    wherein the telephone call to the particular device with telephone capability is placed after a predetermined time period of at least one minute has elapsed after the call to the emergency services telephone number has ended.

18. The method of operating a call service center as recited in claim 17, wherein receipt of the notification indicating that the particular device with telephone capability has been used to call the emergency services telephone number serves as the indication that the call to the emergency services telephone number ended.

19. The method of operating a call service center as recited in claim 17, further comprising displaying on a display screen an indication that the particular device with telephone capability has been used to call the emergency services telephone number.

20. The method of operating a call service center as recited in claim 19, further comprising:
after receiving the notification indicating that the particular device with telephone capability has been used to call the emergency services telephone number, retrieving from a database information relating to a person associated with the particular device with telephone capability; and
displaying the retrieved information on the display screen.

21. The method of operating a call service center as recited in claim 17, wherein a delay for the predetermined period of time is instituted by the computer system.

22. The method of operating a call service center as recited in claim 17, wherein the notification indicating that a particular device with telephone capability has been used to call an emergency services telephone number is received by the computer system after the predetermined time has elapsed.

23. A device with telephone capability, the device comprising:
an input interface;
a transceiver;
a microprocessor;
a power subsystem; and
a computer readable memory, the computer readable memory holding microprocessor instructions that, when executed by the microprocessor, cause the device with telephone capability to:
detect that a call has been placed using the input interface to an emergency services telephone number using the transceiver and that the call to the emergency services telephone number has ended;
after the call to the emergency services telephone number has ended, delay by a predetermined time, and after the delay, send a notification to a preselected recipient indicating that the call has been placed to the emergency services telephone number; and
send to the preselected recipient an indication of a location of the device with telephone capability;
wherein the delay elapses before any notification that the call has been placed to the emergency services telephone number is sent to any preselected recipient;
and wherein the location of the device with telephone capability is determined by the device with telephone capability after the delay.

24. A system, comprising:
a device with telephone capability;
a computer system at a call service center, the computer system including a processor and memory holding instructions executable by the processor; and
a network connection from the computer system to an electronic communications network;
wherein the device with telephone capability is programmed to, after the device with telephone capability has been used to call an emergency services number and after the call to the emergency services number has ended, send via the electronic communications network to the computer system a notification that the device with telephone capability has been used to place the call to an emergency services telephone number not associated with the call service center;
and where the instructions, when executed by the processor, cause the computer system at the call service center to
receive via the connection to the electronic communications network the notification indicating that a particular device with telephone capability has been used to place the call to the emergency services telephone number; and
delay for a predetermined time and then place an outgoing call to the particular device with telephone capability in reaction to the notification that the particular device with telephone capability has been used to place the call to the emergency services telephone number.

* * * * *